May 1, 1956     H. WESTERKAMP     2,743,763
APPARATUS FOR JOINING THE ENDS OF MAGNETIC SOUND TAPE
Filed May 13, 1953
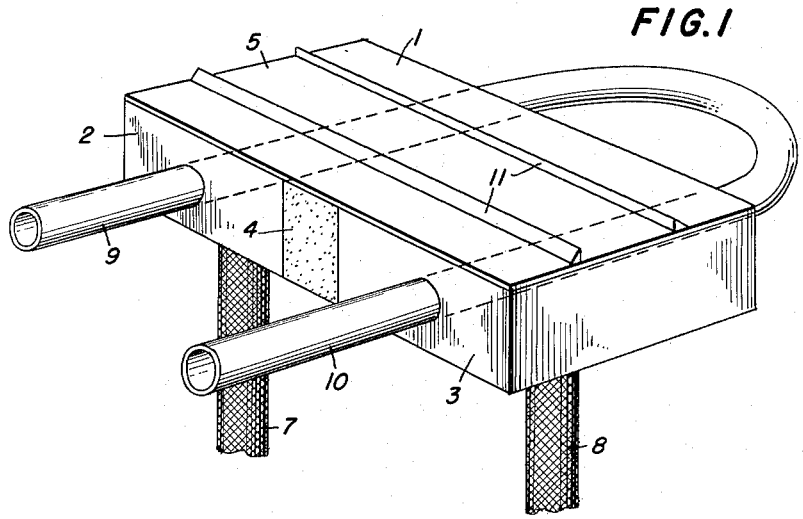
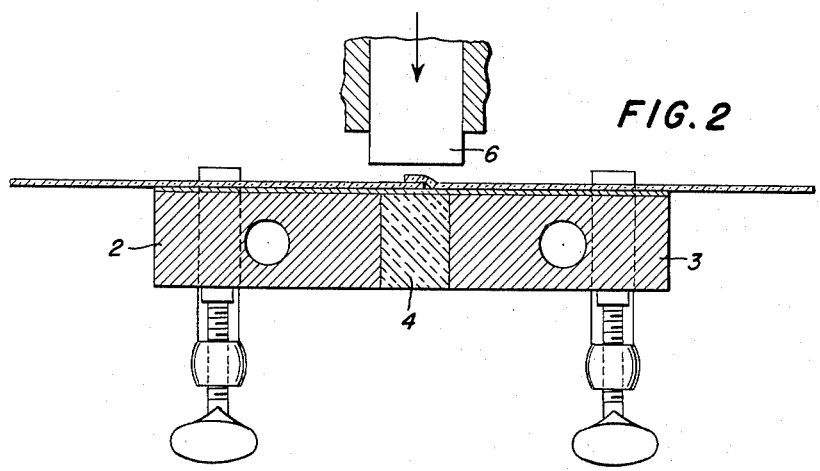
INVENTOR
HUGO WESTERKAMP
BY
ATTORNEYS

United States Patent Office 2,743,763
Patented May 1, 1956

2,743,763

APPARATUS FOR JOINING THE ENDS OF MAGNETIC SOUND TAPE

Hugo Westerkamp, Koeln-Poll, Germany

Application May 13, 1953, Serial No. 354,728

5 Claims. (Cl. 154—42)

This invention relates to a method and means for joining the ends of magnetic sound tapes which have a base consisting of a hot-moldable plastic material and which are either permeated throughout their entire thickness with magnetic powder or carry such powder upon their outer layers.

An object of the present invention is to provide a method and means for joining the ends of magnetic sound tapes in such manner that the joint is completely invisible and mechanically as strong as any other section of the tape.

Other objects of the present invention will become apparent in the course of the following specification.

In accomplishing the objects of the present invention it was found desirable to join the ends of the tape first by overlapping them and placing them in contact with a flat, smooth, metallic plate which is preferably heated electrically. Then these ends are subjected to pressure which causes the fusion of the overlapping portions whereby, preferably, the tape zones adjoining the fusion zone of the overlapping tape ends are kept during the heating of the fusion zone at a temperature which is below the softening temperature of the hot-moldable tape material. Furthermore the fusion zone of the tape ends is narrower than the pressure zone.

The metal plate which is in contact with the overlapping zone of the tape ends during the application of pressure to this zone is preferably heated by its own electrical resistance by being included in an electrical circuit. It is also possible to heat the overlapping ends of the tape by means of high frequency.

The device for carrying out the method of the present invention includes a press the lower portion of which consists of a flat smooth metal plate. Both ends of the metal plate rest upon two bus bars for high current while the central portion of the metal plate which is adapted to receive the press die rests upon a block of insulating material mounted between the bus bars. This portion is provided with lateral bearing surfaces for the alignment of the said edges of the tape ends which are being joined. By way of example, these lateral bearing surfaces can be shaped as a channel receiving the tape ends and having a width which is equal to the width of the tape.

It is apparent that in the course of the pressure exerted by the die a part of the tape material at the overlapping position of the tape ends may be squeezed laterally so that an undesired widening of the tape may take place. To overcome this, in accordance with the present invention the tape channel is formed by strips which cooperate with the press die to cut off the excess material.

The invention will appear more clearly from the following detailed description when taken in connection with accompanying drawing showing, by way of example, a preferred embodiment of the inventive idea.

In the drawing:

Figure 1 is a perspective view of the press table constructed in accordance with the present invention and Figure 2 is a cross section through the table and illustrates the overlapping end portions of the tape and the press die disposed above these overlapping portions.

The press table shown in the drawing consists of a smooth, flat metal plate 1, the two end portions of which rest upon bus bars 2 and 3, respectively. The center portion of the plate 1 rests upon a block 4 which is located between the bars 2 and 3 and which is made of an insulating material.

The metal plate 1 is provided in its longitudinal direction with a small channel 5, limited by ribs 11. The width of the channel 5 is preferably the same as the width of the magnetic sound tape 12 while the depth of the channel is at most equal to the thickness of the tape.

Figure 2 shows that the two ends of the tape 12 are so arranged upon plate 1 that they overlap each other. These overlapping portions are located above the insulating block 4 and directly below the press die 6.

Supports 7 and 8 may carry wires, not shown, which are connected to the bus bars 2 and 3 and which are also connected to a suitable current transformer, not shown in the drawing. The transformer may supply an electric current of about 1000 amperes to the bars 2 and 3 and then the electric current will flow through these bars without heating them to any appreciable extent and also through the metal plate 1. The central portion of the plate 1 which is located immediately above the insulating block 4 will be heated by this electric current so that the overlapping ends of the magnetic sound tape will be softened. Then, as the press die 6 is lowered the tape ends will fuse with one another.

The bars 2 and 3 are provided with passages containing the ends 9 and 10 of a U-shaped tube. A cooling medium is caused to flow through these tubes. It is apparent that this cooling medium will form a cooling zone in the bars 2 and 3 which will extend into the pressure zone of the press die 6. This is necessary so that the magnetic sound tapes should not be damaged by the pressing process. The temperature within these cooling zones should be below the softening temperature of the thermoplastic material. The lateral edges of the press die 6 will press constantly on the unsoftened tape portions so that the tape and the sound recording thus obtained will not be damaged.

When the current is switched off cooling of the bars 2 and 3 will result in very rapid cooling of the previously heated central portion of the metal plate 1 so that the ends of the magnetic tape will cool off also. It is therefore possible to remove the joined ends of the tape quickly from the pressing apparatus.

In order to prevent the undesirable widening of the tape at the juncture of these ends the upper tapered edges of the ribs 11 will cooperate with the press die 6 in order to cut off any overflowing tape material which may spread out beyond the width of channel 5.

While Figure 2 shows tape ends which are perpendicular to the side edges of the tape in the overlapping position, these tape ends may also be inclined in any suitable manner. Other variations and modifications may be made in the described apparatus and process without exceeding the scope of the present invention. All such variations and modifications are to be included within the scope of the present invention.

What is claimed is:

1. Apparatus for joining the ends of magnetic sound tapes, comprising a press having a press die and a table consisting of a flat, smooth metal plate, two bus bars for high current supporting said plate at two ends and an insulating block mounted between the bus bars, the central portion of the table located beneath the die resting upon said block, said plate being provided with lateral bearing surfaces for the alignment of the side edges of the tape ends to be joined.

2. Apparatus according to claim 1, characterized in that the table is provided with a channel into which the tape ends to be joined can be inserted.

3. Apparatus according to claim 2, characterized in that the width of the channel is equal to the width of the tape and the depth of the channel is at most equal to the thickness of the tape.

4. Apparatus for joining the ends of thermoplastic magnetic sound tapes, comprising a table consisting of a flat, smooth metal plate, a high current bus bar supporting each end of the plate, an insulating block supporting the plate between the bus bars, spaced parallel ribs extending longitudinally of the plate for aligning the side edges of the juxtaposed tape ends, the upper edges of the ribs being tapered, and a press die for engagement with the ribs and the tape ends for trimming the excess tape material.

5. Apparatus for joining the ends of thermoplastic magnetic sound tapes, comprising a table consisting of a flat, smooth metal plate, a high current bus bar supporting each end of the plate, an insulating block supporting the plate between the bus bars, spaced parallel rigs extending longitudinally of the plate for aligning the side edges of the juxtaposed tape ends, and a press die overlying the block and the adjacent portions of the bus bars.

References Cited in the file of this patent

UNITED STATES PATENTS

| | | |
|---|---|---|
| 2,486,204 | Praizner | Oct. 25, 1949 |
| 2,520,737 | Romeyn et al. | Aug. 29, 1950 |
| 2,530,221 | Bender | Nov. 14, 1950 |
| 2,577,183 | Denton | Dec. 4, 1951 |
| 2,621,704 | Langer | Dec. 16, 1952 |
| 2,698,273 | Miner et al. | Dec. 28, 1954 |